(12) United States Patent
Catena et al.

(10) Patent No.: US 7,337,705 B1
(45) Date of Patent: Mar. 4, 2008

(54) PRESS AND SIP DEVICE

(76) Inventors: Laura Catena, 183 Carl St., San Francisco, CA (US) 94117; Elissa Hambrecht, 120 Belgrave Ave., San Francisco, CA (US) 94117

( * ) Notice: Subject to any disclaimer, the term of this patent is extended or adjusted under 35 U.S.C. 154(b) by 0 days.

(21) Appl. No.: 11/760,290

(22) Filed: Jun. 8, 2007

(51) Int. Cl.
A47J 31/00 (2006.01)

(52) U.S. Cl. .................... 99/297; 99/279; 99/287; 99/302 P; 239/33

(58) Field of Classification Search ............... 99/297, 99/279, 302 P, 287; 239/33; 220/705, 706, 220/707, 708, 709
See application file for complete search history.

(56) References Cited

U.S. PATENT DOCUMENTS

| | | | |
|---|---|---|---|
| 1,346,485 A | | 7/1920 | De Arrigunaga |
| 1,847,879 A | * | 3/1932 | Knecht .................. 239/33 |
| 2,943,794 A | * | 7/1960 | Sussman ................ 239/33 |
| 3,935,318 A | | 1/1976 | Mihailide |
| 4,086,848 A | | 5/1978 | Hahn |
| 4,494,668 A | * | 1/1985 | Lottick .................. 220/709 |
| 5,005,717 A | | 4/1991 | Oilar |
| 5,067,395 A | | 11/1991 | Timm |
| 5,183,183 A | * | 2/1993 | Hernandez ............. 222/175 |
| 5,406,717 A | * | 4/1995 | Dofka ................... 34/104 |
| 5,441,752 A | * | 8/1995 | Sandin .................. 426/82 |
| 5,462,194 A | | 10/1995 | Barnwell |
| 5,478,586 A | | 12/1995 | Connor |
| 5,509,605 A | * | 4/1996 | Cripe .................... 239/33 |
| 5,545,879 A | | 8/1996 | Brotz |
| 5,618,570 A | | 4/1997 | Banks et al. |
| 5,635,233 A | | 6/1997 | Levinson |
| 5,673,789 A | | 10/1997 | Degraff-Eugene |
| 5,932,098 A | | 8/1999 | Ross |
| 5,942,143 A | | 8/1999 | Hartman et al. |
| 6,142,384 A | | 11/2000 | Shafik |
| 6,153,147 A | * | 11/2000 | Craig .................... 422/59 |
| 6,263,781 B1 | | 7/2001 | Calagui |

(Continued)

FOREIGN PATENT DOCUMENTS

DE            337236            7/1993

(Continued)

OTHER PUBLICATIONS

ChefsResource, "Coffee and Tea Related Items [Coffee Presses]," http://www.chefsresource.com/small-appliances-coffee-and-tea.html, date unknown.

(Continued)

Primary Examiner—Reginald L. Alexander
(74) Attorney, Agent, or Firm—Bromberg & Sunstein LLP (57) ABSTRACT

A press and sip device including a straw and sieve coupled together to permit pressing solid particles to infuse flavor into a freshly brewed beverage consumable from the container in which it was prepared. The straw and sieve unit can be used in containers of various sizes through the use of gasket attachments. The sieve is provided with openings that allow the beverage to receive flavor from the solid particles while maintaining the particles separate from the beverage when the beverage is consumed. The straw is provided with apertures in the side wall of the straw that limit intake of beverage to the liquid above the sieve separated from the solid particles. The device is contemplated as having detachable elements to facilitate cleaning and storage.

19 Claims, 8 Drawing Sheets

U.S. PATENT DOCUMENTS

| | | | |
|---|---|---|---|
| 6,684,756 B2 | 2/2004 | Kerr | |
| 6,725,763 B2 | 4/2004 | Cai | |
| 6,964,223 B2 | 11/2005 | O'Loughlin | |
| 7,032,505 B2 | 4/2006 | Brady | |
| 7,040,218 B1 | 5/2006 | Biolchini, Jr. | |
| 7,040,547 B1 * | 5/2006 | Nelson | 239/33 |
| 2002/0092919 A1 | 7/2002 | Campagna | |
| 2004/0182461 A1 * | 9/2004 | Margetson | 138/109 |
| 2005/0247207 A1 | 11/2005 | Saint | |
| 2006/0175248 A1 | 8/2006 | Raimondo et al. | |
| 2007/0222619 A1 * | 9/2007 | Moran | 340/573.1 |

FOREIGN PATENT DOCUMENTS

| | | |
|---|---|---|
| DE | 449957 | 11/2001 |
| DE | 493662 | 8/2004 |
| WO | 02067739 | 9/2002 |
| WO | WO2004050499 A1 | 6/2004 |
| WO | 2006/089201 | 8/2006 |

OTHER PUBLICATIONS

Coffee Trade Journal, "The Double Shot coffee press from Planetary Design," Tea & Coffee Trade Journal, May 20, 2005.

Dales, M., et al., "Caught in a French Press," Family Practice News, Feb. 15, 2000.

MyMorningCup, "French Presses," http://www.mymorningcup.com/?cPath=French-Presses, date unknown.

Omana, C., et al., "Organoleptic characterisation of selected brewing methods," Indian Coffee, vol. 69 ( 8 ): p. 22-27, date unknown.

PRNewswire, "VentureDESIGNworks Announces A Coffee Press," PR Newswire, Page: NA, Jan. 9, 2006. Gale Group PROMT®. © 2007 The Gale Group. Dialog® File No. 16 Accession No. 12860279.

ProductAlert, "Caffe Express Flavor Aged Dessert Coffee—European Coffee Press," Product Alert, v 26, n 17, Sep. 9, 1996.

Stankevich, D.G., "Coffee Press Commercial," HFN The Weekly Newspaper for the Home Furnishing Network, v69, n24, p. 37(1), Jun. 12, 1995.

* cited by examiner

PRESS AND SIP DEVICE

TECHNICAL FIELD AND BACKGROUND ART

The present invention relates to a device for use with beverages flavored by solid particles such as coffee beans or grounds, tea leaves, mint leaves, cloves, cinnamon, chocolate, cocoa, mate, or other herbs or spices.

BACKGROUND ART

French press devices are known for their ability to prepare a freshly brewed beverage. It is further known in the art to use a French press device in an individual container from which the user can drink. U.S. Pat. No. 5,618,570 discloses a container with a plunger assembly slidably mounted therein that allows the user to prepare a beverage and drink the beverage directly from the container. After grounds and hot water have been added to the liquid container the user pushes the rod connected to a rigid perforated disk down through the liquid as far as possible, thereby trapping the grounds or leaves between the disk and the bottom of the container. The user can then remove the detachable portion of the plunger assembly, leaving the perforated disk in the bottom portion of the container, and drink the beverage from the container.

Consumption of cool beverages has long been achieved through the use of straws. It is also known in the art to add a filter to a drinking straw. U.S. Pat. No. 6,142,384 discloses a personal portable filtration device attachable to an ordinary drinking straw that allows a user to remove contaminants or particles from the beverage he or she is drinking. Drinking mate with a straw is a known practice during which a beverage is consumed with a straw that provides filtration.

SUMMARY OF THE INVENTION

According to a first aspect of the invention, there is provided a device for both preparing and consuming a beverage flavored by solid particles. The device provides a straw characterized by a side wall. The straw has at least one aperture in the side wall of the straw. A beverage may be consumed through the straw by sucking the beverage in through the at least one aperture in the side wall of the straw. The straw uniquely doubles as the handle or plunger attached to a sieve. The sieve is coupled to the straw distal to the at least one aperture in the side wall of the straw. Solid particles, such as tea leaves, are held by the sieve at the bottom of a cup or container, while the user may consume the beverage from above the sieve, through the apertures in the sidewall of the straw.

The straw may have a closed distal end. Alternatively, a solid center of the sieve may be provided to seal the distal end of the straw.

The sieve may be removably coupled to the straw. The removable coupling can be provided in various forms such as a snap, a threaded coupling, a screw, or a tab. The snap may be in the form of a ridge on the sieve that removably fits into a groove on the straw. The threaded coupling may be in the form of an external thread forming a helical ridge on the straw and an internal thread forming a helical ridge on the sieve, which allows the straw to be screwed into and out of the sieve. The screw coupling may be provided by inserting a screw through a hole in the sieve and screwing it into an internally threaded hole in the straw. The tab coupling may be provided in the form of a tab that extends radially from the straw for engagement beneath a ridge on the sieve.

Alternatively, the sieve may be permanently coupled to the straw through the use of a weld, or other permanent coupling.

Another aspect of the invention is to provide the sieve with a gasket around the periphery of the sieve so as to achieve a fit within containers of different internal cross sectional dimensions.

The sieve may be provided in an alternative form as a plurality of leaves forming a circular outer circumference.

The straw of the present invention may be additionally provided with a detachable plastic mouthpiece having a filter therein. The straw may be provided as a metal straw.

According to another aspect of the invention the straw-sieve unit may be provided with a container having at least one opening for admitting a beverage into an interior of the container. The sieve can have a periphery corresponding to a cross section of the interior of the container. The device may further be provided with a lid adapted to cover the opening of the container. The lid can have an aperture in it adapted for receiving the straw there through.

BRIEF DESCRIPTION OF THE DRAWINGS

The foregoing features of the invention will be more readily understood by reference to the following detailed description, taken with reference to the accompanying drawings, in which:

FIG. 2 is an illustration of a straw-sieve unit with a gasket attached to the periphery of the sieve. FIGS. 2-1 is an illustration of a cross sectional view of a sieve with an attached gasket.

FIG. 2b is an illustration of a sieve with a compression spring attached to the periphery of the sieve. FIG. 2b-1 is a magnified view of the compression spring attached to periphery of the sieve.

DETAILED DESCRIPTION OF SPECIFIC EMBODIMENTS

Figure 1:
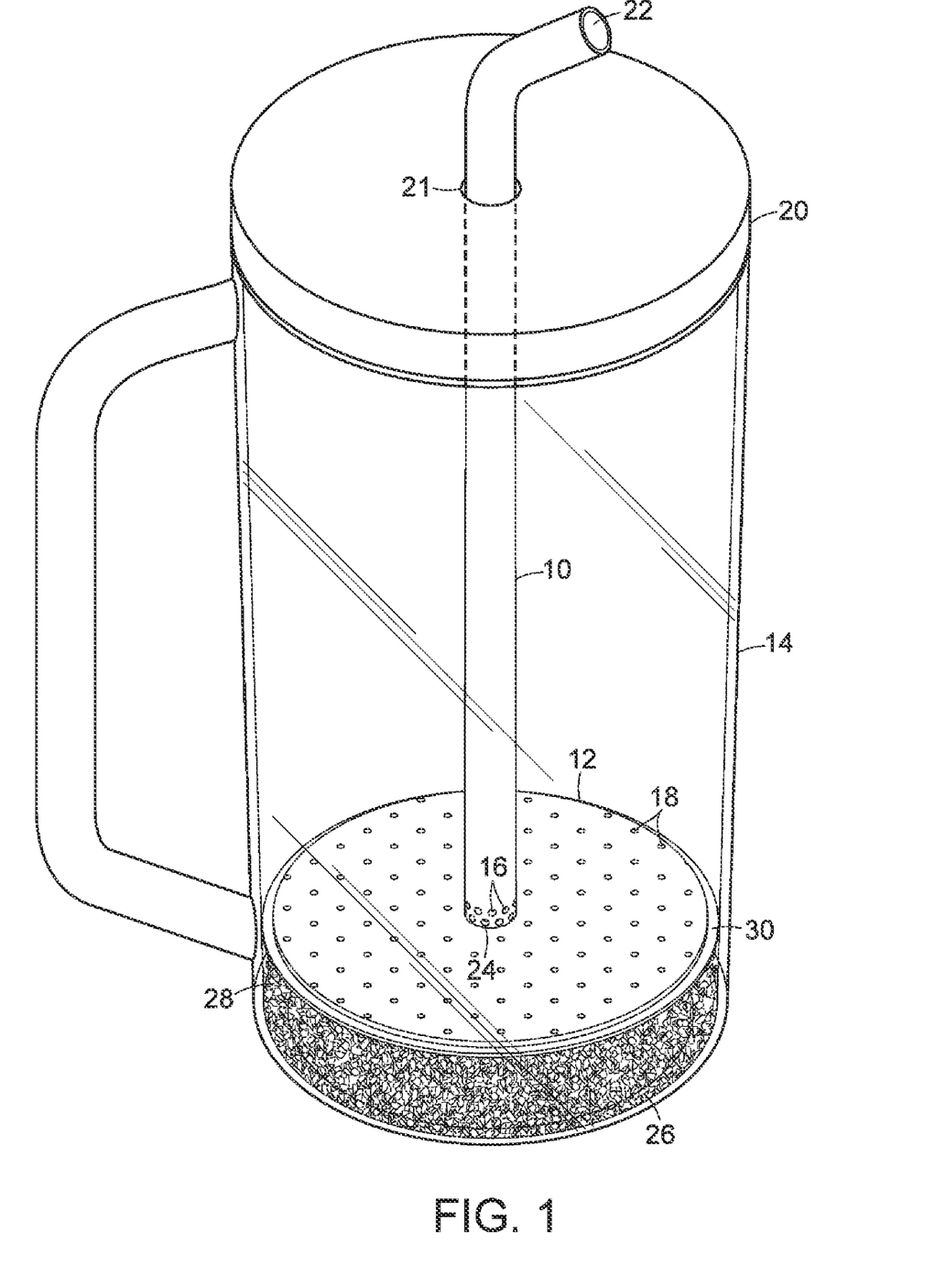
FIG. 1 is an illustration of a straw-sieve unit assembled within a container holding particles for flavoring a beverage.

FIG. 1 is an illustration of a straw-sieve unit oriented within a container holding particles for flavoring a beverage. The straw-sieve unit comprises two primary components, namely straw 10 and sieve 12. Straw 10 is characterized by a side wall that forms the shape of the generally tubular structure. The straw 10 has a proximal end 22 and a distal end 24. The straw has an opening at the proximal end of the straw 22, whereby the user can consume a beverage. The straw is further characterized by the apertures 16 that are maintained in the sidewall of the straw. The apertures 16 in the sidewall of the straw act as a point of ingress for the beverage. The apertures 16 may further provide a secondary filter mechanism. The apertures could be any geometric or irregular shape. Straw 10 is coupled to sieve 12 at the distal end of the straw.

Sieve 12 separates solid particles from the drinking volume accessible to the apertures in the straw. Sieve 12 is provided with openings 18 that permit liquid to pass through, but prevent larger solid particles from passing through. The sieve is characterized by a periphery corresponding to a cross section of the interior of the container 14. In FIG. 1 the sieve unit is provided in a disc-like geometry. Other sieve geometries are contemplated such as a square or other shape adapted to fit the interior of the container 14 or an alternative container. The container 14 illustrates an example of a container that the straw-sieve unit might be used in. The container can be embodied in a variety of shapes and sizes. The container could be provided with or without a handle. Additionally, the container can be made out of a variety of materials commonly used in the beverage industry for insulating a beverage. Other embodiments are contemplated in which the container is made of stainless steel, plastic, cardboard, or extruded polystyrene foam. A lid 20 for covering the container 14 can be optionally provided. The lid is provided with aperture 21 so that the straw can pass through. The aperture 21 will facilitate the manipulation of the straw-sieve unit while allowing the beverage to remain covered.

In use the device depicted in FIG. 1 performs various useful functions. The user begins by adding the solid, flavor infusing particles 26 of his or her choice into container 14 with the lid 20 and the straw-sieve unit removed from container 14. The solid particles provided can be in the form of coffee beans or grounds, tea leaves, mint leaves, cloves, cinnamon, chocolate, cocoa, mate, other herbs or spices, or any solid particles the user wishes to use to add flavor to the beverage. After adding particles 26 to container 14, the user can proceed to add water, milk, or any other liquids, to container 14 to receive flavor from particles 26. The liquid added may be hot or cool. After adding the desired liquid to container 14 and allowing the beverage to steep, the user can proceed to insert the straw-sieve unit into the container forcing the solid particles to the bottom of the container. As a coupled unit the straw 10 is used for pushing the sieve 12 down into the container 14. Because the straw provides this additional function, the straw is designed such that it is sufficiently stiff to maintain its shape when held by a user to push the sieve 12 down into a container. The sieve unit is provided with openings 18 that permit liquid to pass through the sieve as the sieve is pushed down through the beverage, but prohibits the solid particles from passing through. As such, the user may alternatively add the liquid after insertion of the straw-sieve unit and the liquid would penetrate the sieve and interact with the solid particles to receive flavor.

The straw-sieve unit is then engaged in its other function as a mechanism for pressing the solid particles that have been added to flavor the beverage. The straw-sieve unit can be held by the straw and moved longitudinally to agitate the mixture and press the particles to promote the flavor infusion process. The sieve unit is sufficiently rigid to facilitate pressing the solid particles.

After the user has engaged the device to infuse the beverage with the flavor, the beverage can then be consumed directly from the container through straw 10. The flavor infusing solid particles 26 are held in the container beneath the sieve while the flavored beverage rises above the sieve. This is the first level of filtration. As the user sucks on the straw the consumable beverage enters the straw through the openings or apertures 16 in the side wall of the straw. As the beverage enters the straw through the openings, the openings may additionally prevent particles of a size corresponding to the size of the openings from entering the straw, providing a secondary source of filtration if desired. In this embodiment fluid enters the straw only through the apertures located in the side wall of the straw.

Figures 2, 2B, 2B, 21:
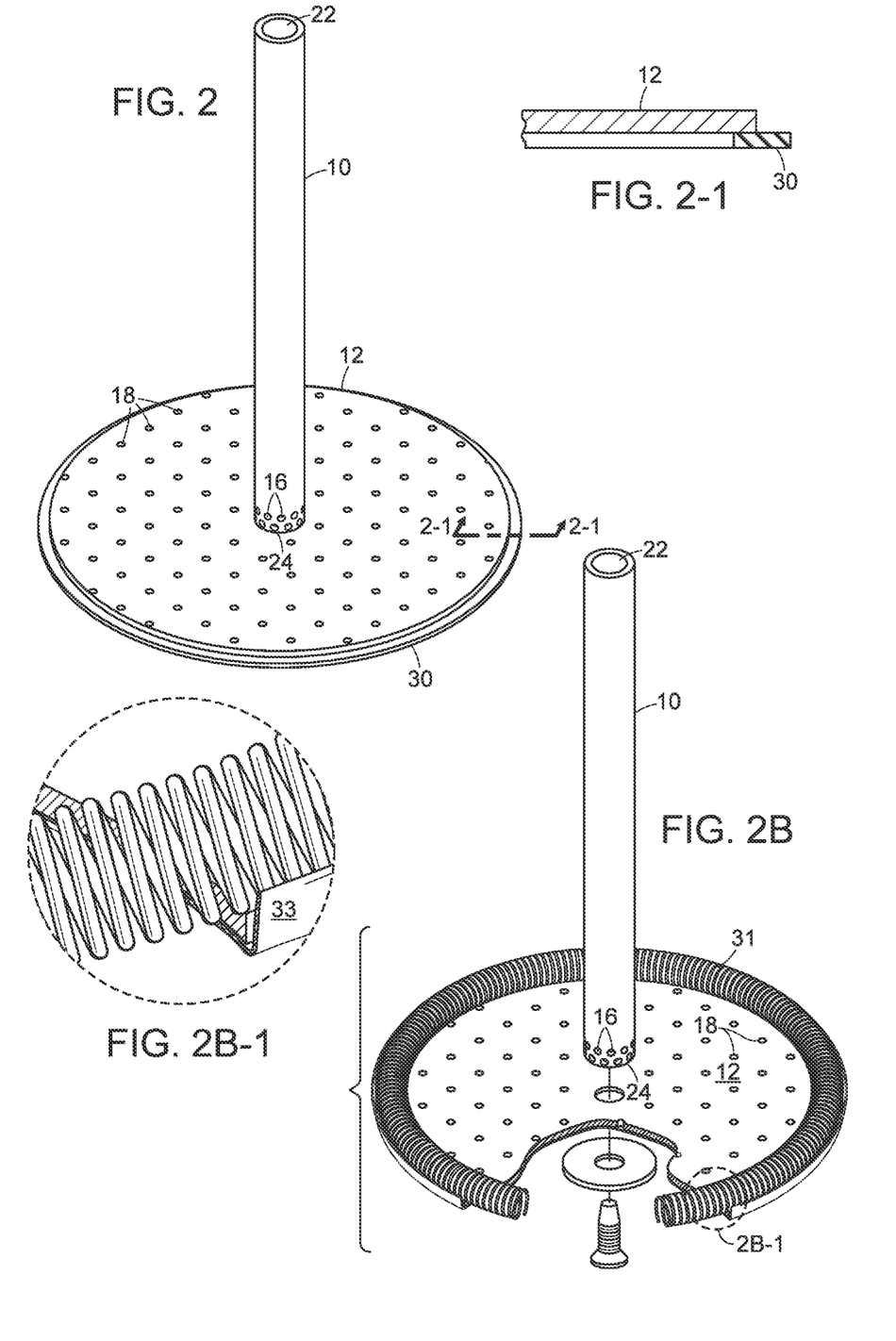

FIG. 2 is an illustration of a straw-sieve unit with a gasket attached to the periphery of the sieve. The gasket 30 provides the straw-sieve unit with the ability to function within containers of different cross sections, while still enabling the periphery of the sieve 12 to form a close fit within each container. The close fit prevents the solid particles used for flavoring the beverage from escaping around the periphery of the sieve. The gasket can be produced in various forms and composed of various materials. A rubber gasket is illustrated in FIG. 2, but the use of other materials is contemplated. FIGS. 2-1 illustrates a cross section of the sieve 12 with gasket 30 attached. Other methods of sealing the area between the periphery of the sieve and the interior of the container may be provided.

The device of FIG. 2b includes a compression spring 31 attached to the periphery of the sieve combined with a lip/skirt 33 that may be provided as a mesh or other flexible material. The device of FIG. 2b can be provided for sieve 12. Mesh 33 of the device of FIG. 2b can serve as the gasket for sieve 12. FIG. 2b-1 is a magnified view of the compression spring and lip/skirt 31.

FIG. 2 further illustrates openings 18, also shown in FIG. 1. Openings 18 are illustrated in the depicted embodiment as round openings. It will be appreciated by those of skill in the art that these openings can be created in a variety of geometric shapes and be formed by different methods. For example, the openings could be openings that were punched or drilled into a solid piece, the openings could be openings that remained after a pattern of wire mesh was created, or the openings could be formed through filling a mold with material to form the sieve that has partitions to prevent the space that will later be openings 18 from being filled. The same is true of the apertures 16 located in the side wall of straw 10. The openings 16 and 18 can take various sizes and or shapes limited only by the desired filtration prescribed by the manufacturer of the device.

Figure 3:
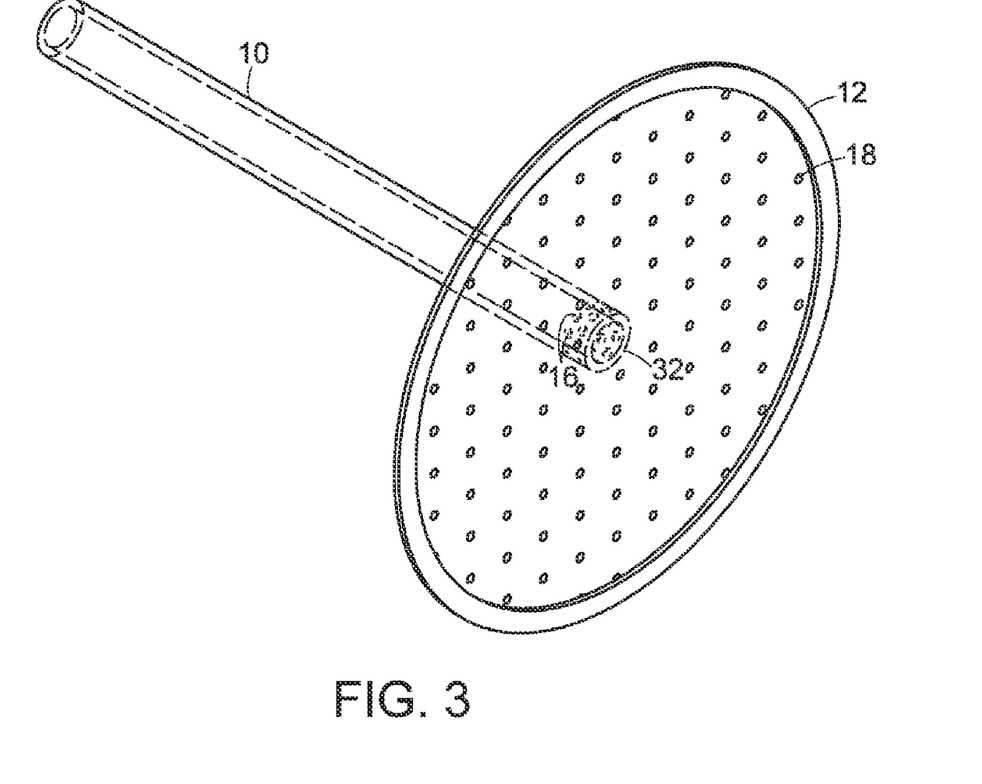
FIG. 3 is an illustration of a straw-sieve unit where the sieve comprises a solid center adapted to seal the distal end of the straw.

FIG. 3 is an illustration of a straw-sieve unit where the sieve 12 comprises a solid center 32 adapted to seal the distal end of straw 24. The straw 10 can be provided with a distal end 24 that is open while the sieve can be provided with a center that is solid. The solid center of the sieve will afford the sieve the ability to seal the distal open end of the straw when the two elements are coupled to prevent the entering of any particles and fluid that progress through the sieve from entering the straw directly through the distal end of the straw. Closing the opening of the distal end of the straw 24 ensures that the entire beverage being consumed by the user enters the straw through the apertures 16 in the straw.

Figure 4:
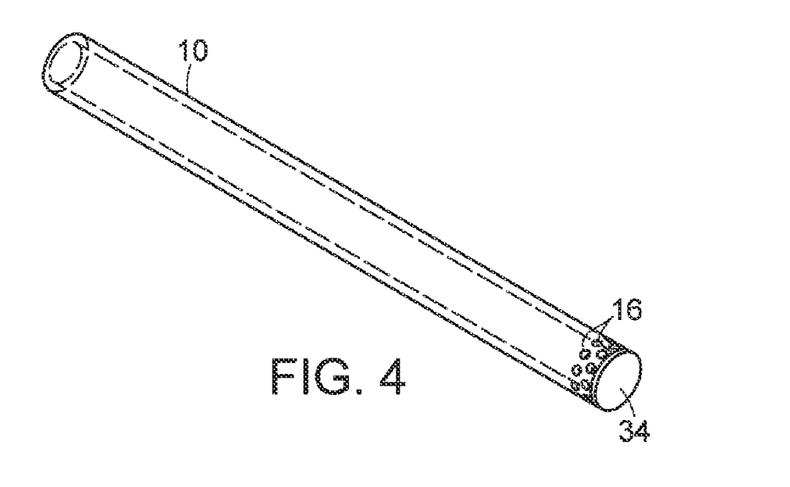
FIG. 4 is an illustration of an embodiment of a straw of the present invention where the distal end of the straw is a closed end.

FIG. 4 is an illustration of an embodiment of a straw of the present invention where the distal end of the straw is a closed end 34. Providing the straw with a closed end 34 is an alternative to the embodiment illustrated in FIG. 3. In this embodiment the straw could be closed at the distal end 24 and the sieve would not have to be provided with a solid center. The same function of preventing entry directly into the bottom of the straw is now achieved with a different structure that provides flexibility in the manufacturing of the device as well as in the cleaning and maintenance of the straw-sieve unit. Providing the straw with a closed end 34 can be achieved through a variety of structures. Some examples include a cap welded or fastened to the end of the straw, a friction fitting plug, a plug that can be screwed into the distal end of the straw, or other various seals recognized by one of skill in the art.

Figure 5:
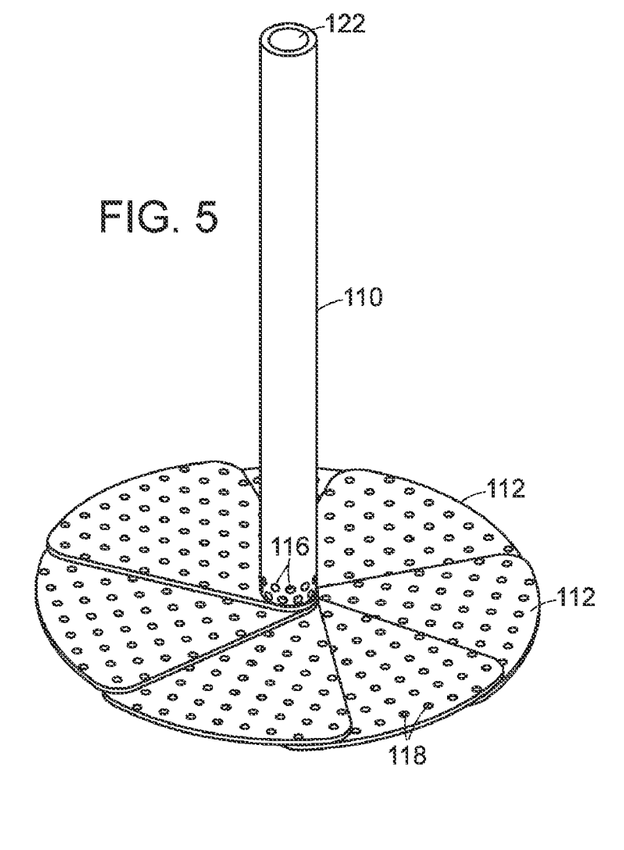
FIG. 5 is an illustration of an embodiment of a straw-sieve unit wherein the sieve comprises a plurality of leaves.

In accordance with the embodiment of FIG. 5 the sieve of the straw-sieve unit comprises a plurality of leaves 112. The sieve is provided in this embodiment in the form of a plurality of leaves that are rotational at their attachment to the base of the straw. The leaves are still provided with openings 118 to filter solid particles from the beverage. In a related alternative embodiment the leaves of FIG. 5 may be attached such that they fold downward or upward. In such an alternative embodiment the sieve composed of folding leaves is provided with a collar that prevents the leaves from folding upward as the straw-sieve unit is pushed into a container. In both embodiments where the sieve is formed of leaves, the leaves are provided in an overlapping system, where the edge of one leaf resides on top of another leaf. This insures no gaps between the leaves and prevents particles from being able to penetrate the sieve between the individual leaves that make up this embodiment of the sieve.

Figure 6:
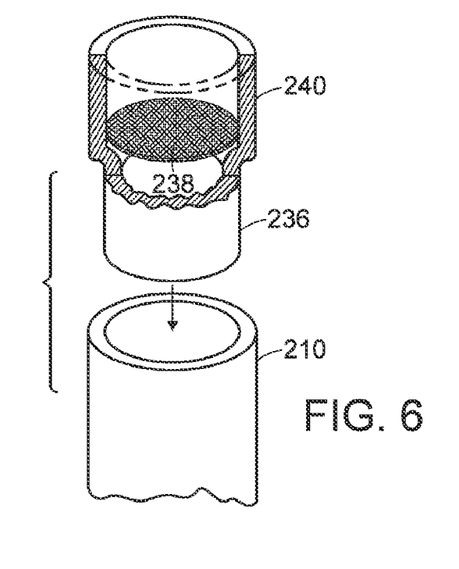
FIG. 6 is an illustration of a detachable plastic mouthpiece having a filter therein.

FIG. 6 is an illustration of a detachable plastic mouthpiece 240 having a filter 238 therein. Straw 10 may be provided in a variety of materials, including metal. Because of the material properties of metal, the straw will conduct heat from a hot liquid. The detachable mouth piece 240 allows the straw to be composed of conductive materials, while also allowing the user to consume the beverage without being burned by the heated straw. The mouthpiece may additionally be used to provide a filtration device 238. This filtration device is provided in the form of a mesh screen, but is not limited to such embodiments and may be provided in any structure of filtration that would occur to one of ordinary skill in the art. Additionally, the detachable plastic mouthpiece is provided with a coupling mechanism 236. In the illustrated embodiment the coupling is provided by a friction fit. The friction fit may be provided such that the mouthpiece fits into the straw or such that the straw fits into the mouthpiece. A variety of other detachable coupling mechanisms such as a tab, a threaded connection, a snap fit, or other coupling mechanisms that occur to one of skill in the art can be provided for removably coupling mouthpiece 240 and straw 10.

Figures 7, 8:
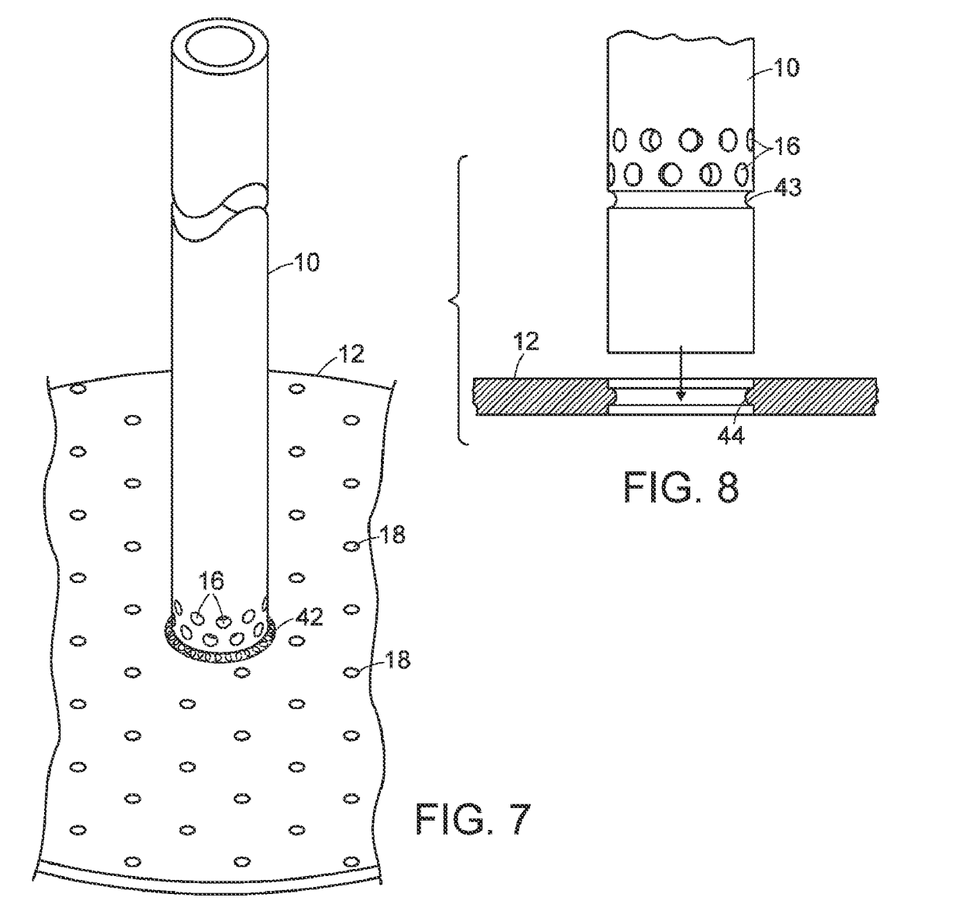
FIG. 7 is an illustration of the straw-sieve unit coupled by a weld.
FIG. 8 is an illustration of the straw-sieve unit coupled by a snap.

FIG. 7 is an illustration of the straw-sieve unit coupled by a weld 42. The straw unit 10 is here coupled to the sieve 12 by a permanent attachment in the form of a weld bead 42, formed during manufacturing.

FIG. 8 is an illustration of the straw-sieve unit coupled by a snap. The straw unit 10 is here coupled to the sieve 12 by a detachable coupling mechanism in the form of a snap fit. The snap fit is provided by an indentation 43 in the sidewall of the distal end of the straw and a protruding ridge 44 formed on the interior of the sieve. As the straw is pressed into the sieve the sieve snaps into the indentation 43 provided to securely couple the sieve to the straw unit. The elements can be detached by applying sufficient force to dislocate the snap fit.

Figure 9:
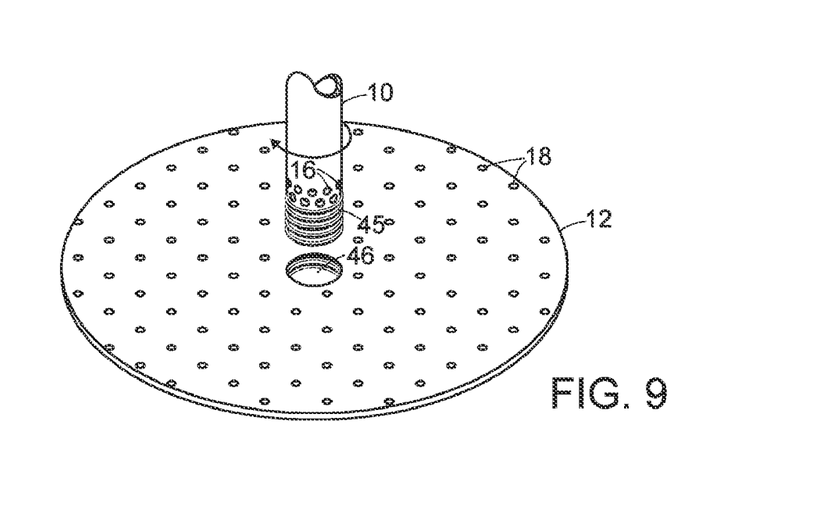
FIG. 9 is an illustration of the straw-sieve unit coupled by a thread forming a helical ridge.

FIG. 9 is an illustration of the straw-sieve unit coupled by a thread forming a helical ridge 45. The straw unit 10 is here coupled to the sieve 12 by a detachable coupling mechanism in the form of an external threaded ridge formed on the distal end of the straw 10 that corresponds to an internal threaded ridge 46 formed on the sieve. This allows the user to screw the straw into and out of the sieve by opposing rotary motion of the two pieces. The detachable coupling further facilitates cleaning and storage of the device. The type of detachable coupling mechanism provided in FIG. 9 may be provided on any embodiment of the straw and sieve elements disclosed.

Figure 10:
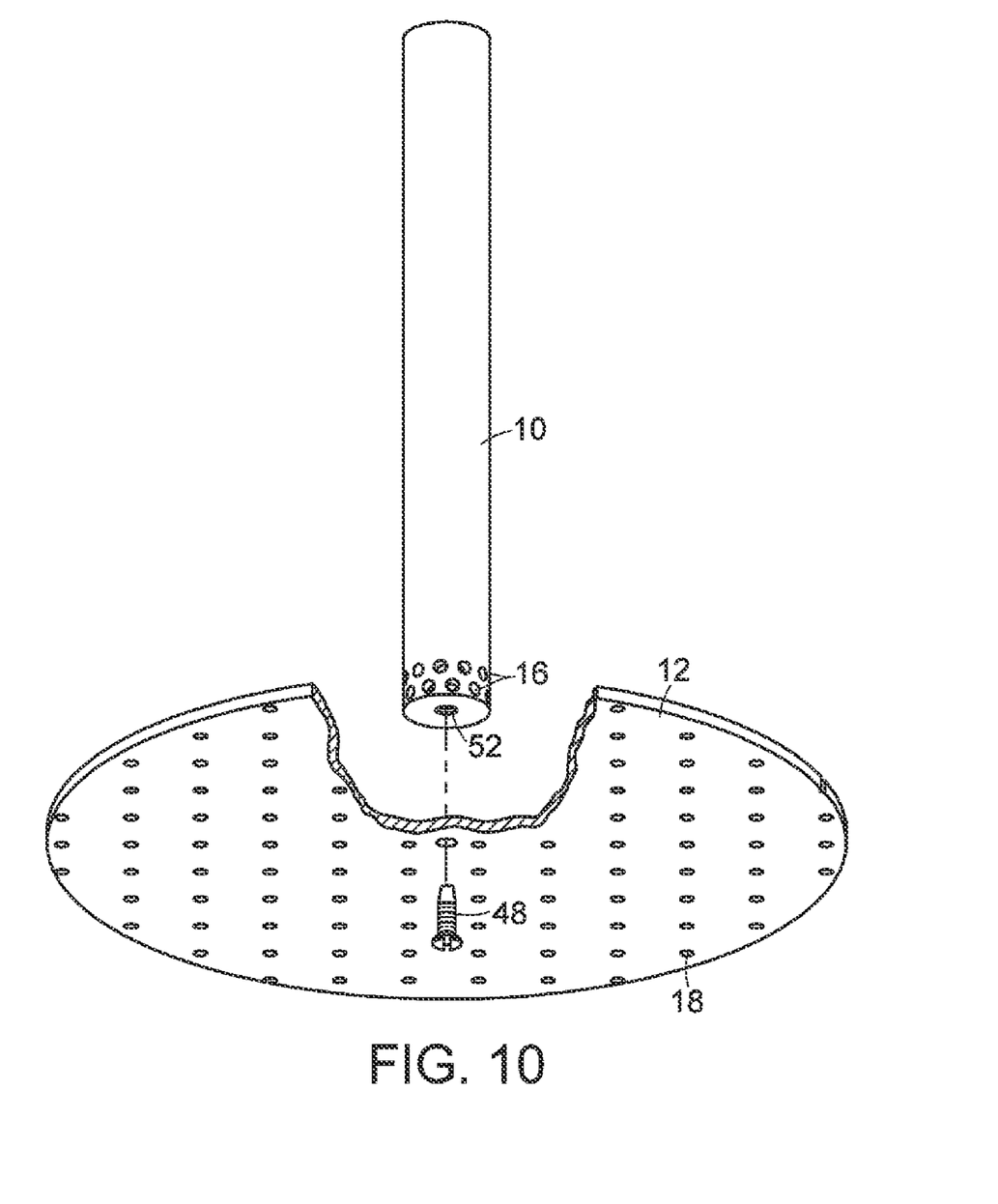
FIG. 10 is an illustration of the straw-sieve unit coupled by a screw attached through a hole in the sieve into an internal thread in the straw.

FIG. 10 is an illustration of the straw-sieve unit coupled by a screw attached through a hole in the sieve into an internal thread in the straw. The straw unit 10 is here coupled to the sieve 12 by a detachable coupling mechanism in the form of a screw. In the illustrated embodiment the screw is inserted axially through a hole in the sieve to an internal thread in the distal end of the straw. This type of detachable coupling mechanism may also be provided on any embodiment of the straw and sieve elements disclosed.

Figure 11A:
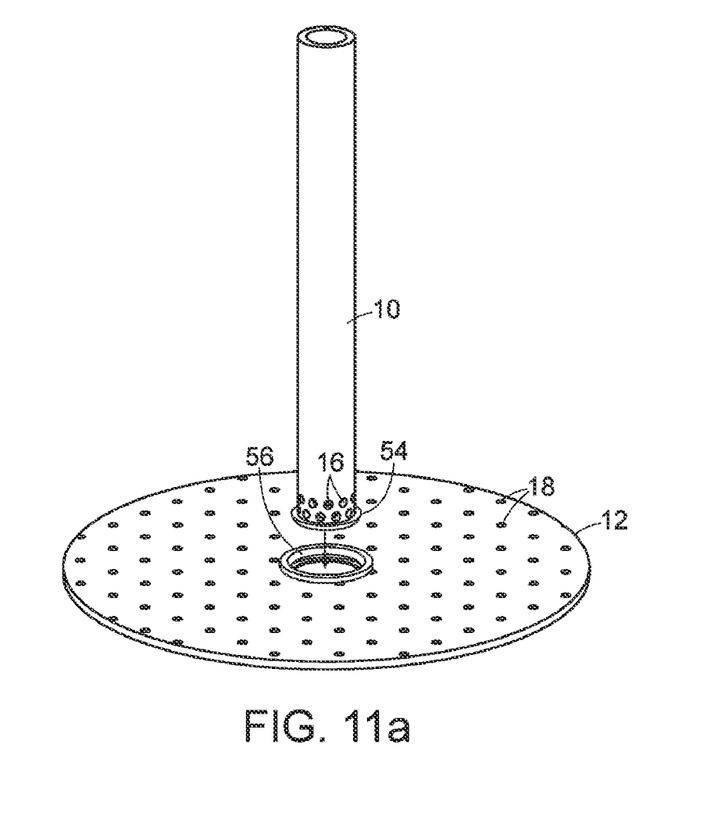
FIGS. 11a and 11b are illustrations of the straw-sieve unit coupled by a tab extending radially from the straw for engagement beneath a ridge on the sieve.
Figure 11B:
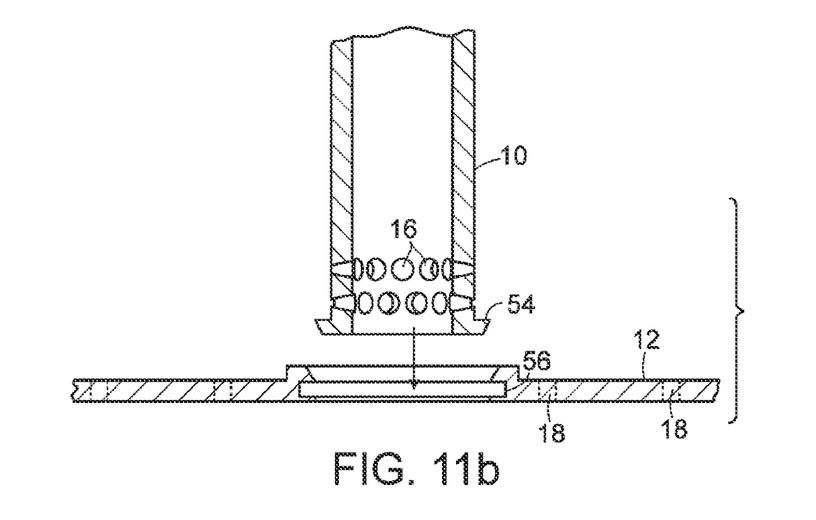

FIGS. 11*a* and 11*b* are illustrations of the straw-sieve unit coupled by a tab 54 extending radially from the straw for engagement beneath a ridge 56 on the sieve. FIG. 11*a* provides a perspective view of the straw-sieve unit coupled by a tab. FIG. 11*b* provides a profile view of the straw-sieve unit coupled by a tab. The radially extending tab is provided as a single tab extending the entire circumference of the straw in FIGS. 11*a* and 11*b*. The tab can be provided, however, as more than one tab or as a tab that does not extend for the entire circumference of the straw. When the straw is inserted into the opening on the sieve, the tab or tabs will be securely held beneath the ridge and will additionally bottom out on a lower ridge to securely couple the straw to the sieve.

Figure 12A:
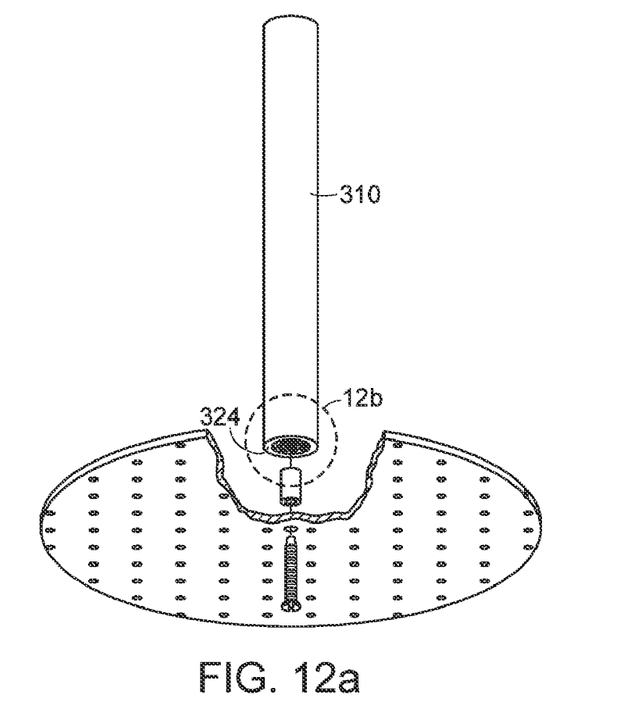
FIG. 12 is an illustration of the straw sieve unit coupled by an attachment that provides a gap between the distal end of the straw and the top of the sieve.
Figure 12B:
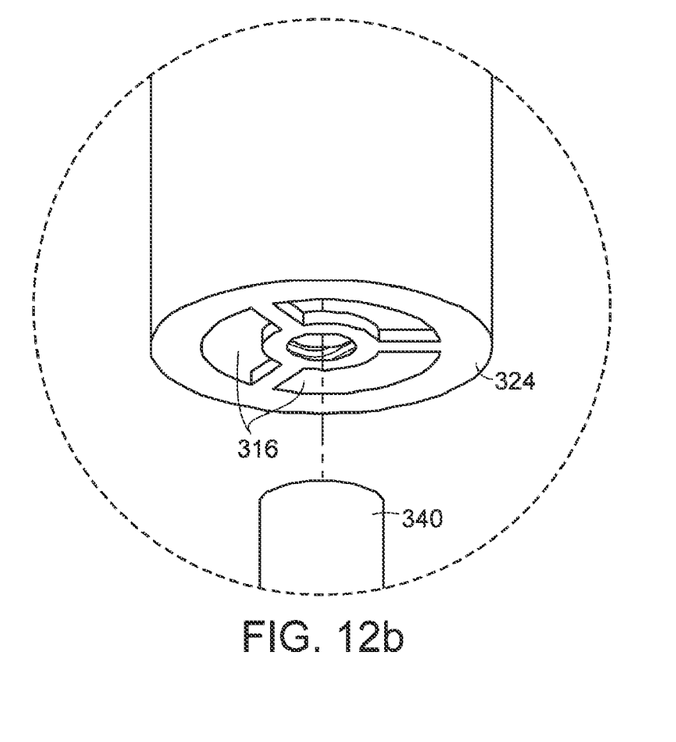
FIG. 12b. is a magnified view of the attachment and the distal end of the straw illustrated in FIG. 12.

In accordance with an alternate embodiment, FIG. 12 shows a straw-sieve unit coupled by an attachment which provides a gap between the distal end of the straw and the top of the sieve. FIG. 12*b*. further provides a magnified view of the attachment and the distal end of the straw illustrated in FIG. 12. The gaps 316 provide an alternative to the apertures 16 completely enclosed in the sidewall of the straw 310. With the straw coupled by attachment 340 such that the distal end of the straw 324 is not in direct contact with the sieve, the beverage to be consumed must still proceed to be filtered by the sieve before entering the straw.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A device for preparing and consuming a beverage flavored by solid particles comprising:
    a straw, the straw characterized by a side wall, the straw having at least one aperture in the side wall, the straw further characterized by a proximal end and a distal end; and
    a sieve coupled to the straw nearer to the distal end than to the proximal end, such that the at least one aperture in the side wall of the straw is positioned between the sieve and the proximal end of the straw.

2. A device according to claim 1, wherein the distal end of the straw is a closed end.

3. A device according to claim 1, wherein the sieve comprises a solid center adapted to seal the distal end of the straw.

4. A device according to claim 1, further comprising means for removably coupling the straw to the sieve.

5. A device according to claim 1, wherein the sieve comprises a plurality of leaves forming a circular outer circumference.

6. A device according to claim 1, further comprising a gasket around the periphery of the sieve so as to achieve a fit within containers of different internal dimension.

7. A device according to claim 1, further comprising a detachable plastic mouthpiece having a filter therein.

8. A device according to claim 7, wherein the straw is metal.

9. A device for preparing and consuming a beverage flavored by solid particles comprising:
- a container having at least one opening for admitting a beverage into an interior of the container;
- a straw characterized by a proximal end, a side wall and a distal end, the distal end being for insertion into the container, and, the straw having at least one aperture in the side wall; and
- a sieve coupled to the straw, such that the at least one aperture in the side wall of the straw is positioned between the sieve and the proximal end of the straw, the sieve having a periphery corresponding to a cross section of the interior of the container and wherein the sieve includes openings that permit liquid to pass through but prevent larger solid particles from passing through the sieve.

10. A device according to claim 9, wherein the distal end of the straw is a closed end.

11. A device according to claim 9, wherein the sieve seals the distal end of the straw when the sieve is coupled to the straw.

12. A device according to claim 9, further comprising:
- a lid adapted to cover the opening of the container, the lid having an aperture adapted for receiving the straw there through.

13. A device for preparing and consuming a beverage flavored by solid particles comprising:
- a container;
- a straw characterized by a proximal end, a side wall and a distal end, the distal end being for insertion into the containing means, the straw having at least one aperture in the side wall;
- a sieve having a periphery corresponding to a cross section of the interior of the container; and
- means for coupling the straw to the sieve such that the at least one aperture in the side wall of the straw is positioned between the sieve and the proximal end of the straw.

14. A device according to claim 13, wherein means for coupling comprises a weld.

15. A device according to claim 13, wherein means for coupling comprises a snap.

16. A device according to claim 13, wherein means for coupling comprises a thread forming a helical ridge for rotary coupling.

17. A device according to claim 13, wherein means for coupling comprises a screw for attachment through a hole in the sieve into an internal thread in the straw.

18. A device according to claim 13, wherein means for coupling comprises a tab extending radially from the straw for engagement beneath a ridge on the sieve.

19. A device according to claim 13, further comprising a lid adapted to cover the opening of the container, the lid having an aperture adapted for receiving the straw there through means for covering the container.

* * * * *